United States Patent
Tse et al.

(10) Patent No.: US 12,418,591 B1
(45) Date of Patent: Sep. 16, 2025

(54) SYSTEMS AND METHODS FOR PROVIDING APPLICATION AND SUBSCRIPTION AWARE USER PLANE FUNCTION SELECTION, STEERING, AND ANCHORING

(71) Applicant: Verizon Patent and Licensing Inc., Basking Ridge, NJ (US)

(72) Inventors: Lap Tse, Marietta, GA (US); Massimiliano Troiani, Frisco, TX (US); David Taft, Keller, TX (US); Parry Cornell Booker, Sunnyvale, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 18/645,987

(22) Filed: Apr. 25, 2024

(51) Int. Cl.
*H04L 67/141* (2022.01)
*H04L 67/60* (2022.01)

(52) U.S. Cl.
CPC ............ *H04L 67/141* (2013.01); *H04L 67/60* (2022.05)

(58) Field of Classification Search
CPC .............................. H04L 67/141; H04L 67/60
See application file for complete search history.

(56) References Cited

U.S. PATENT DOCUMENTS

| | | | |
|---|---|---|---|
| 11,737,122 B1* | 8/2023 | Cai | H04W 72/53 370/259 |
| 12,057,902 B2* | 8/2024 | Huang | H04B 7/0456 |
| 2021/0126840 A1* | 4/2021 | Venkataramu | H04L 61/4511 |
| 2022/0038554 A1* | 2/2022 | Merwaday | H04L 45/64 |
| 2022/0174032 A1* | 6/2022 | Zhu | H04L 45/121 |
| 2023/0309005 A1* | 9/2023 | Rodrigo | H04L 67/56 |
| 2024/0348575 A1* | 10/2024 | Kim | H04L 61/4588 |

* cited by examiner

*Primary Examiner* — Benjamin R Bruckart

(57) ABSTRACT

A device may receive, from a user equipment (UE), a request for an application, and may receive, from the UE, parameters of the application and key performance indicator (KPI) targets for the application. The device may receive, based on the request, KPIs from a core network, a mobile edge computing (MEC) device, and an application server, and may compare the KPIs and the KPI targets for the application. The device may determine, based on comparing the KPIs and the KPI targets, whether to utilize the MEC device or the application server for providing the application to the UE. The device may selectively identify a first user plane function (UPF) associated with the MEC device based on determining to utilize the MEC device, or may identify a second UPF associated with the application server based on determining to utilize the application server.

20 Claims, 12 Drawing Sheets

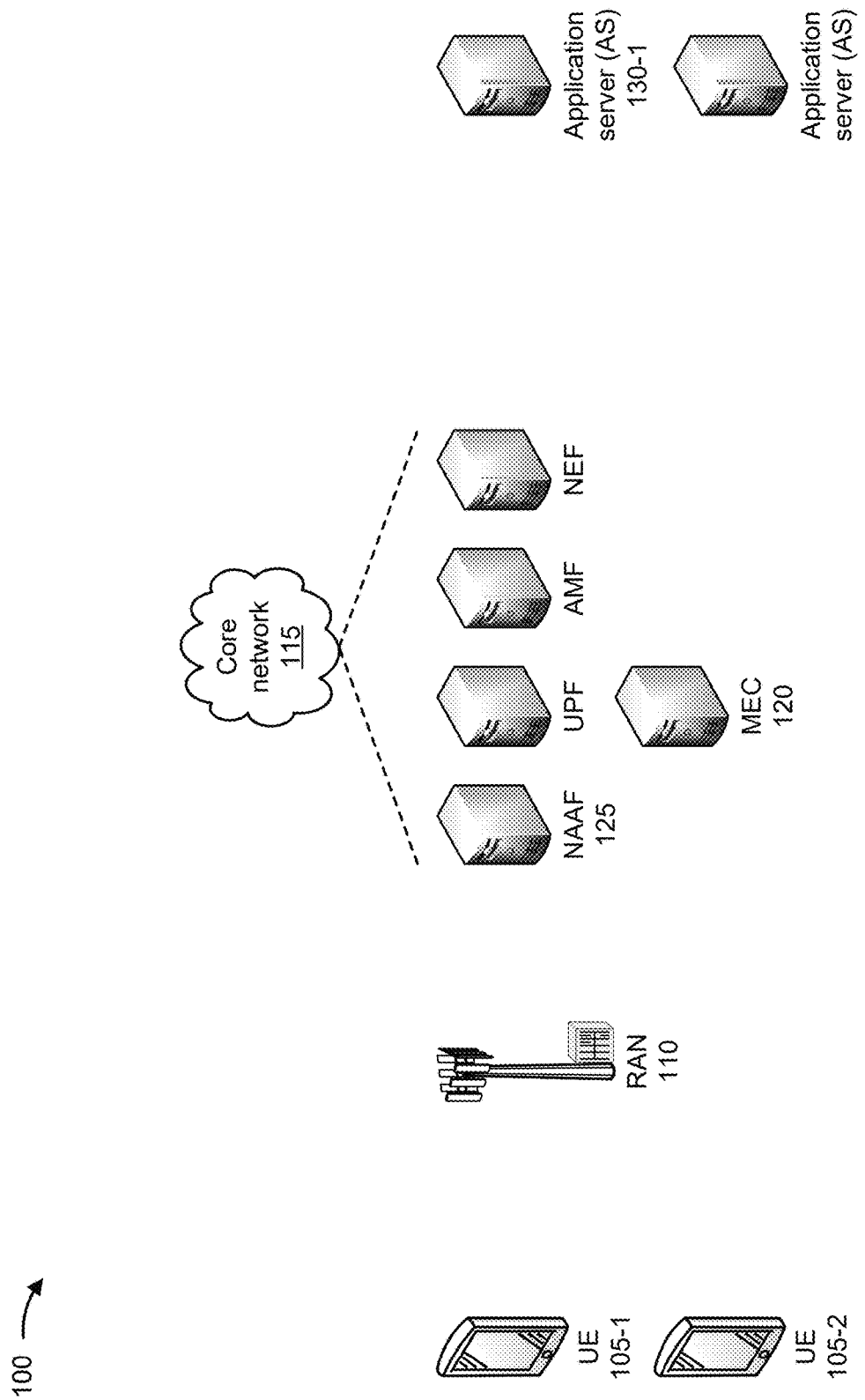

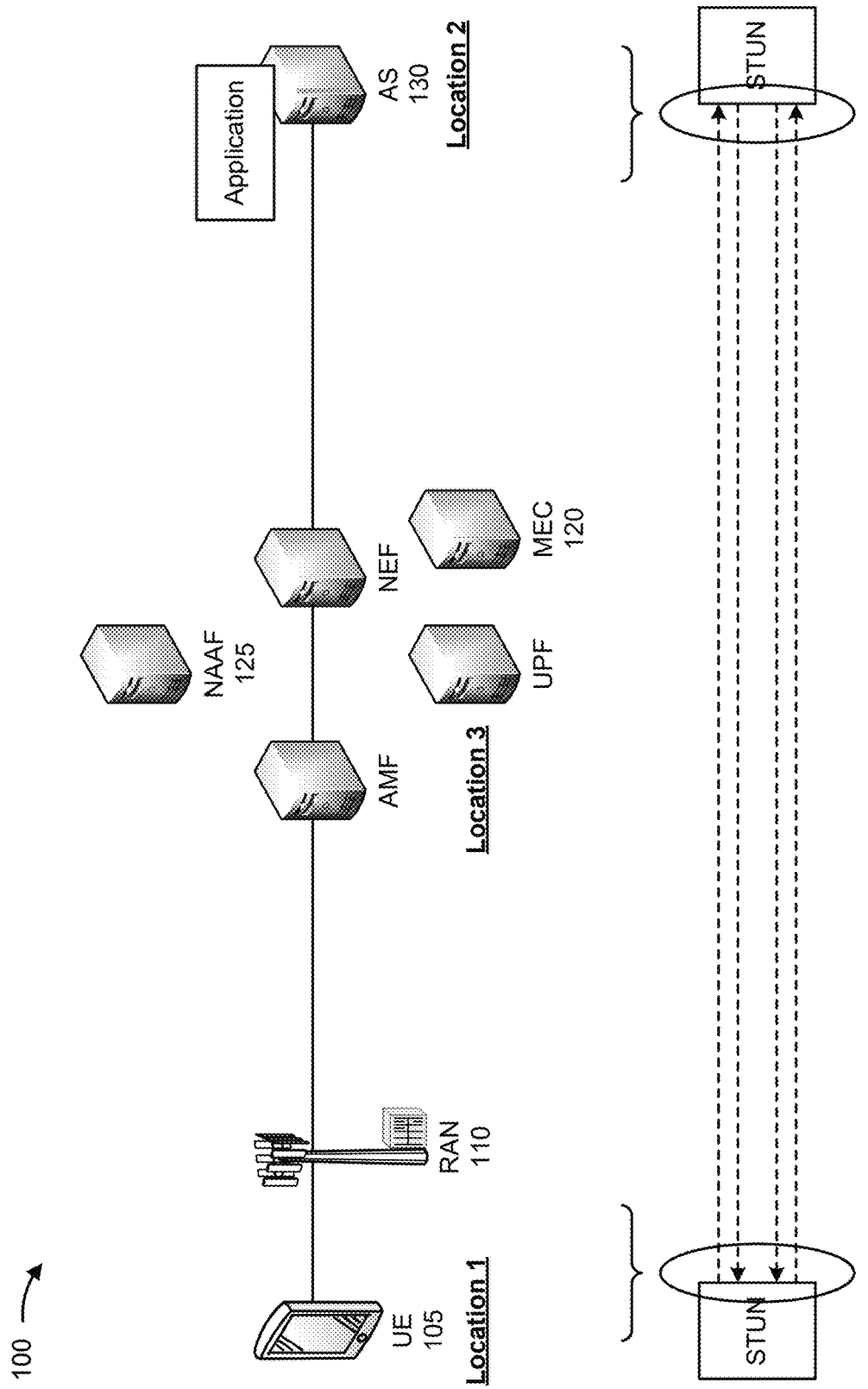

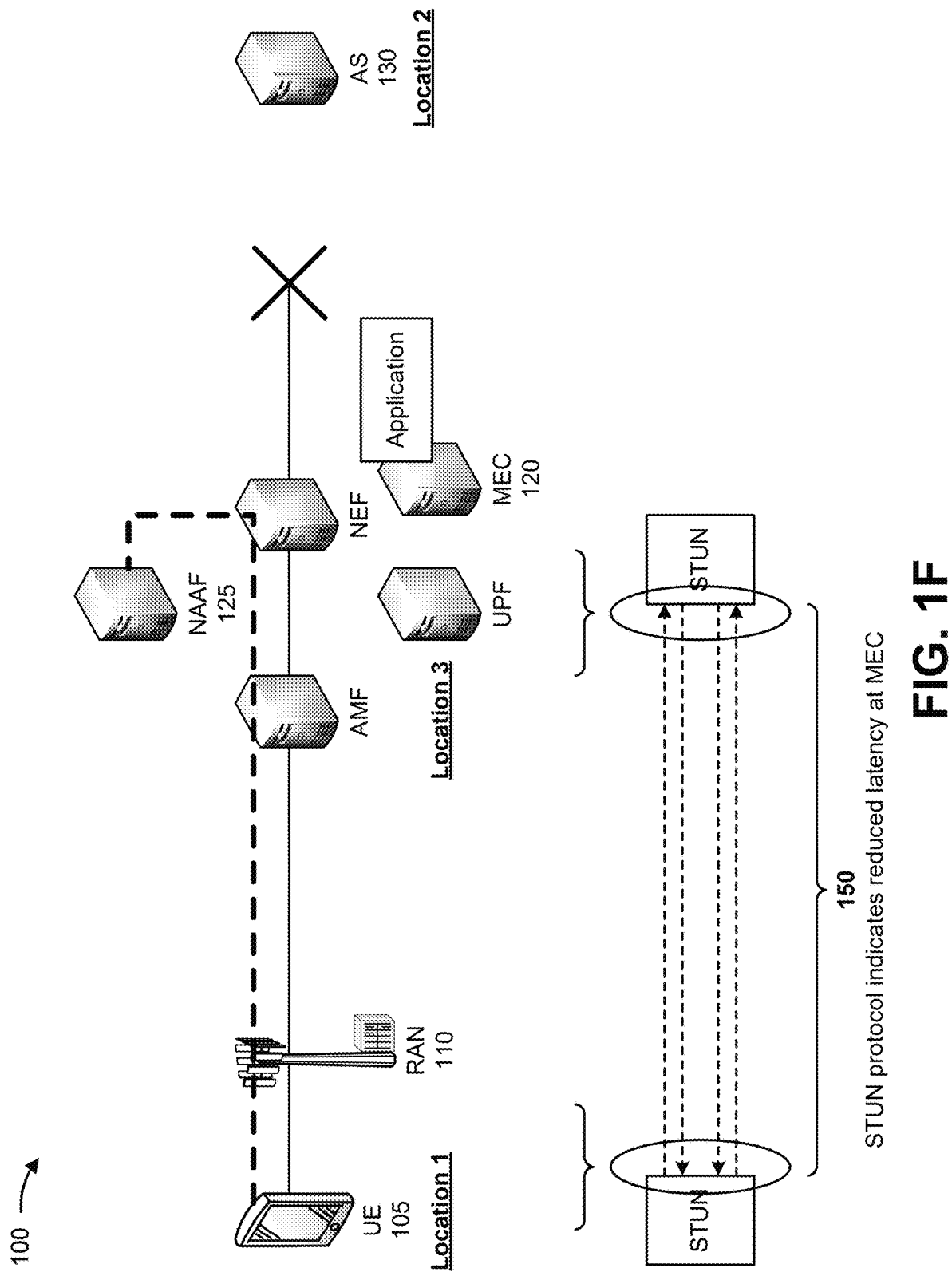

SYSTEMS AND METHODS FOR PROVIDING APPLICATION AND SUBSCRIPTION AWARE USER PLANE FUNCTION SELECTION, STEERING, AND ANCHORING

BACKGROUND

Interactive digital services, such as online applications, encompass the interaction of users with services (e.g., gaming services) via the Internet. Online applications include the integration of various technologies to facilitate the delivery of interactive digital entertainment for users.

BRIEF DESCRIPTION OF THE DRAWINGS

FIGS. 1A-1I are diagrams of an example associated with providing application and subscription aware user plane function (UPF) selection, steering, and anchoring.

DETAILED DESCRIPTION OF EXAMPLE EMBODIMENTS

Figure 1B:
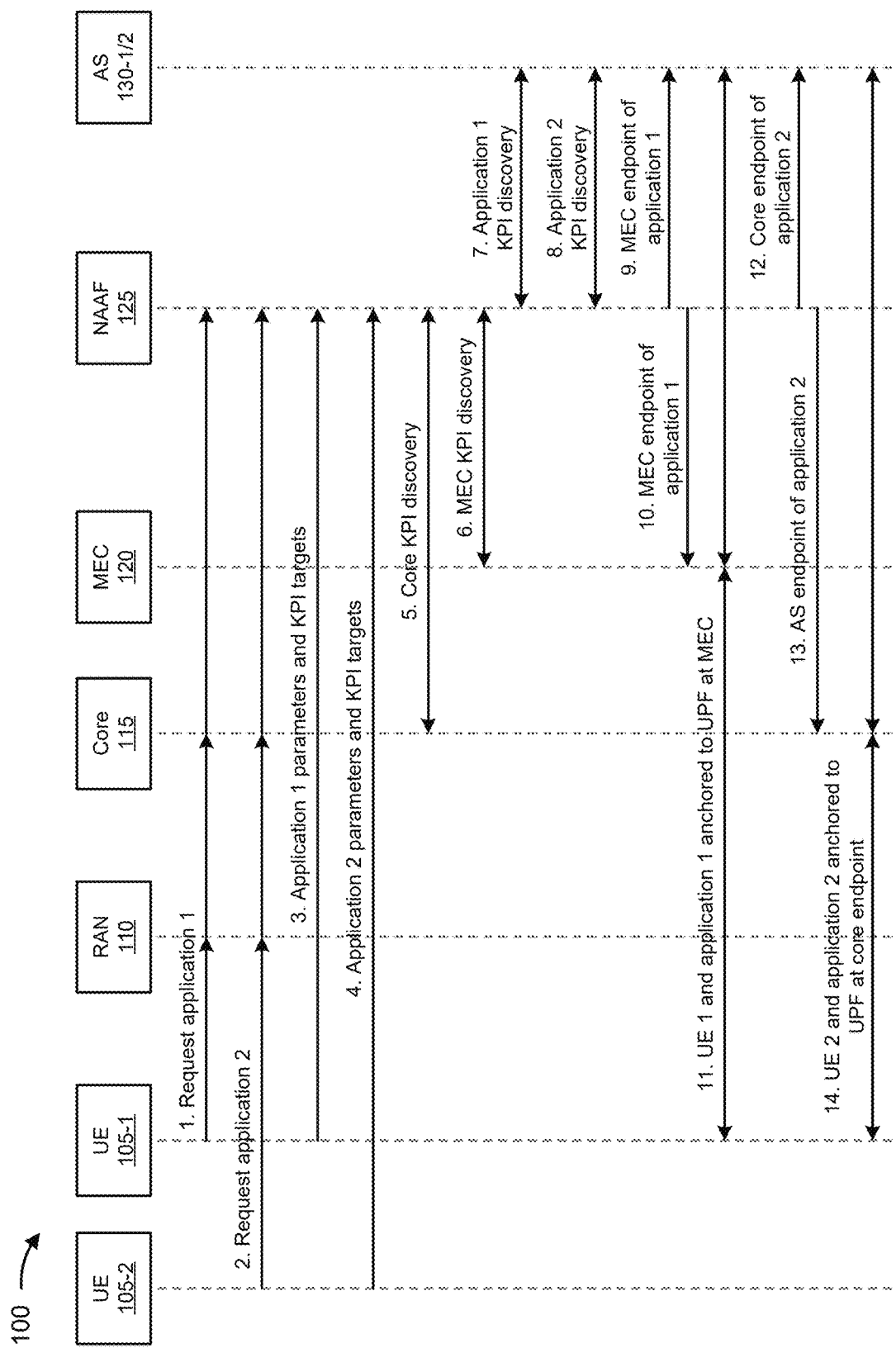

The following detailed description of example implementations refers to the accompanying drawings. The same reference numbers in different drawings may identify the same or similar elements.

Users of online applications frequently experience delays when attempting to connect to application servers during peak usage times. For example, when attempting to access gaming applications, users may face wait times ranging from forty-five minutes to one hour, even with subscriptions to premium network services. Despite the network being able to quickly handle traffic, such delays occur because the application servers are overwhelmed by the volume of simultaneous users attempting to connect. Furthermore, network service providers lack comprehensive end-to-end metrics to evaluate and manage an online experience beyond the network infrastructure. For example, key performance indicators (KPIs) become unknown to a network once the network traffic crosses into external Internet domains and reaches application servers that are experiencing congestion beyond the network service provider's control. The absence of mechanisms to derive end-to-end metrics that accurately represent a user-level experience for applications exacerbates the difficulty in maintaining a promised quality of service (QOS).

Thus, current techniques for providing online applications consume computing resources (e.g., processing resources, memory resources, communication resources, and/or the like), networking resources, and/or other resources associated with handling delays associated with traffic congestion at gaming application servers, failing to provide mechanisms that derive end-to-end metrics that represent a user-level experience for online applications, handling failures associated with providing a promised QoS for online applications, such as gaming, failing to provide adequate service for applications during peak usage times, and/or the like.

Some implementations described herein provide a device (e.g., a network application aware function (NAAF)) that provides application and subscription aware UPF selection, steering, and anchoring. For example, the NAAF may receive, from a user equipment (UE), a request for an application, and may receive parameters of the application and key performance indicator (KPI) targets for the application. The NAAF may receive, based on the request, KPIs from a core network, a mobile edge computing (MEC) device, and an application server, and may compare the KPIs and the KPI targets for the application. The NAAF may determine, based on comparing the KPIs and the KPI targets, whether to utilize the MEC device or the application server for providing the application to the user equipment. The NAAF may selectively identify a first user plane function (UPF) associated with the MEC device based on determining to utilize the MEC device for providing the application to the user equipment, or may identify a second UPF associated with the application server based on determining to utilize the application server for providing the application to the user equipment.

In this way, the NAAF provides application and subscription aware UPF selection, steering, and anchoring. For example, the NAAF may optimize network traffic management for online applications by reducing a time required to establish connections with application servers during periods of high network demand. For example, the NAAF may obtain end-to-end metrics representing a UE application level experience based on UE subscription information and a protocol analysis, and may provide UPF selection, steering, and anchoring for a UE based on the end-to-end metrics. The selected UPF may optimize network efficiency for application traffic provided to the UE. The NAAF may adjust the UPF selection in response to application server congestion, and may steer traffic to a mobile edge computing (MEC) device. The NAAF may re-anchor the UPF from a MEC device to a service access point (SAP) UPF based on improved end-to-end metrics, and may activate MEC UPF steering for a UE subscribed to a premium service. Thus, the NAAF may conserve computing resources, networking resources, and/or other resources that would have otherwise been consumed by handling delays associated with traffic congestion at application servers, failing to provide mechanisms that derive end-to-end metrics that represent a user-level experience for applications, handling failures associated with providing a promised QoS for applications, failing to provide adequate service for gaming applications during peak usage times, and/or the like.

FIGS. 1A-1I are diagrams of an example 100 associated with providing application and subscription aware UPF selection, steering, and anchoring. As shown in FIGS. 1A-1I, the example 100 includes a first user equipment (UE) 105-1, a second UE 105-2, a radio access network (RAN) 110, and a core network 115 that includes a network application aware function (NAAF) 125, a user plane function (UPF), an access and mobility management function (AMF), and a network exposure function (NEF). As further shown, the example 100 includes an MEC device 120 (e.g., also referred to as MEC 120), a first application server (AS) 130-1, and a second application server (AS) 130-2. Further details of the UEs 105, the RAN 110, the core network 115, the MEC device 120, the NAAF 125, the application servers 130, the UPF, the AMF, and the NEF are provided elsewhere herein. Although implementations are described in connection with a fifth generation (5G) core network, the implementations may be utilized with other types of core networks, such as a fourth generation (4G) core network.

FIG. 1B depicts an example network application aware function call flow. As shown at step 1 of FIG. 1B, the first UE 105-1 may provide a request for a first application (e.g., application 1) to the RAN 110, and the RAN 110 may forward the request to the core network 115. The core network 115 may forward the request to the NAAF 125, and the NAAF 125 may receive the request for the first application. The request may include user-specific preferences or requirements that may influence selection of the MEC device 120 or an application server 130, ensuring that provision of the first application aligns with expectations and needs of a user of the first UE 105-1. Additionally, or alternatively, the request may include an option to prioritize certain KPI targets over others, depending on the user's current needs or network conditions. This may provide a more tailored first application delivery experience (e.g., an enhanced gaming experience), where the more important aspects of the first application's performance are given precedence.

As shown at step 2, the second UE 105-2 may provide a request for a second application (e.g., application 2) to the RAN 110, and the RAN 110 may forward the request to the core network 115. The core network 115 may forward the request to the NAAF 125, and the NAAF 125 may receive the request for the second application. This demonstrates the capability of the NAAF 125 to handle multiple requests for different applications simultaneously, ensuring that needs of each UE 105 are addressed individually. The request may include user-specific preferences or requirements that may influence selection of the MEC device 120 or an application server 130, ensuring that provision of the second application aligns with expectations and needs of a user of the second UE 105-2. Additionally, or alternatively, the request may include an option to prioritize certain KPI targets over others, depending on the user's current needs or network conditions. This may provide a more tailored second application delivery experience, where the more important aspects of the second application's performance are given precedence.

As shown at step 3 of FIG. 1B, the NAAF 125 may receive parameters and KPI targets associated with the first application from the first UE 105-1. In some implementations, the request for the first application may include the first application parameters and KPI targets necessary for operation of the first application, or the first application parameters and KPI targets may be separate from the request for the first application. When the request for the first application does not include the first application parameters and KPI targets, the NAAF 125 may request the first application parameters and KPI targets from the first UE 105-1, and the first UE 105-1 may provide the first application parameters and KPI targets to the NAAF 125. As shown at step 4, the NAAF 125 may receive parameters and KPI targets associated with the second application from the second UE 105-2. In some implementations, the request for the second application may include the second application parameters and KPI targets necessary for operation of the second application, or the first application parameters and KPI targets may be separate from the request for the second application. When the request for the second application does not include the second application parameters and KPI targets, the NAAF 125 may request the second application parameters and KPI targets from the second UE 105-2, and the second UE 105-2 may provide the second application parameters and KPI targets to the NAAF 125.

As shown at step 5 of FIG. 1B, the NAAF 125 and the core network 115 may perform core KPI discovery (e.g., for KPIs associated with the core network 115). For example, the core network 115, in collaboration with the NAAF 125, may receive core KPIs from various sources, including the core network 115, the MEC device 120, the first application server 130-1, and the second application server 130-2. In some aspects, the core network 115, in collaboration with NAAF 125, may receive KPIs from additional sources, such as user feedback, historical performance data, predictive analytics models, and/or the like. Discovery of the KPIs associated with the core network 115 may provide a more comprehensive understanding of the core network's 115 capabilities and requirements of the first application and the second application, leading to a more accurate determination of a best course of action for delivering the first application to the first UE 105-1 and the second application to the second UE 105-2.

As shown at step 6 of FIG. 1B, the NAAF 125 and the MEC device 120 may perform MEC KPI discovery (e.g., for KPIs associated with the MEC device 120). For example, the MEC device 120, in conjunction with the NAAF 125, may also perform KPI discovery for the KPIs associated with the MEC device 120. The MEC device 120 may be strategically positioned to provide low-latency services, by being in close proximity to the first UE 105-1 and the second UE 105-2. In some aspects, the MEC device 120 may perform MEC KPI discovery with an option to dynamically adjust resources or a configuration of the MEC device 120. This flexibility allows the MEC device 120 to meet the KPI targets more effectively, ensuring optimal performance of the first application for the first UE 105-1 and of the second application for the second UE 105-2. Additionally, or alternatively, the MEC device 120 may utilize machine learning models to improve the accuracy of KPI discovery and prediction over time, leading to more informed decisions about utilizing the MEC device 120 or the application servers 130.

As shown at step 7 of FIG. 1B, the NAAF 125 and the first application server 130-1 may perform first application KPI discovery (e.g., for KPIs associated with the first application). For example, the first application server 130-1, in conjunction with the NAAF 125, may perform KPI discovery for the KPIs associated with the first application. The KPIs associated with the first application may identify performance requirements for the first application, latency requirements for the first application, user subscription information associated with the first application, and/or the like. As shown at step 8 of FIG. 1B, the NAAF 125 and the second application server 130-2 may perform second application KPI discovery (e.g., for KPIs associated with the second application). For example, the second application server 130-1, in conjunction with the NAAF 125, may perform KPI discovery for the KPIs associated with the second application. The KPIs associated with the second application may identify performance requirements for the second application, latency requirements for the second application, user subscription information associated with the second application, and/or the like.

The NAAF 125 may determine whether to utilize the MEC device 120 or the first application server 130-1 to provide the first application to the first UE 105-1 based on comparing the core KPIs, the MEC KPIs, and the first application KPIs with the first application parameters and the KPI targets received from the first UE 105-1. In the example of FIG. 1B, the NAAF 125 may determine to utilize the MEC device 120 to provide the first application to the first UE 105-1 based on comparing the core KPIs, the MEC KPIs, and the first application KPIs with the first application parameters and the KPI targets. The NAAF 125 may determine to utilize the MEC device 120 to provide the first application to the first UE 105-1 when the comparison of the core KPIs, the MEC KPIs, and the first application KPIs with the first application parameters and the KPI targets indicates to utilize the MEC device 120.

As shown at step 9 of FIG. 1B, the NAAF 125 may instruct the first application server 130-1 that the MEC device 120 is to provide the first application to the first UE 105-1, rather than the first application server 130-1. As shown at step 10, the NAAF 125 may instruct the MEC device 120 that the MEC device 120 is to provide the first application to the first UE 105-1, rather than the first application server 130-1. Thus, the NAAF 125 may transmit information identifying the MEC device 120 as the endpoint of the first application. The NAAF 125, after determining to utilize the MEC device 120 for providing the first application to the first UE 105-1, may identify a first UPF associated with the MEC device 120. In some aspects, the NAAF 125 may transmit the information identifying the MEC device 120 as the endpoint of the first application with additional details, such as an expected service quality, an estimated cost savings, or potential performance improvements. Such details may identify the benefits of selecting the MEC device 120 as the endpoint of the first application, and may aid in the decision-making process. Additionally, or alternatively, the NAAF 125 may consider user subscription levels (e.g., premium or standard) when determining the most appropriate UPF for anchoring the first UE 105-1 and the first application. This consideration ensures that the service level provided is consistent with the user's subscription, maintaining customer satisfaction and service quality. As shown at step 11 of FIG. 1B, the NAAF 125 may cause the first UE 105-1 and the first application (e.g., of the first application server 130-1) to be anchored at the first UPF associated with the MEC device 120.

The NAAF 125 may determine whether to utilize the MEC device 120 or the second application server 130-2 to provide the second application to the second UE 105-2 based on comparing the core KPIs, the MEC KPIs, and the second application KPIs with the second application parameters and the KPI targets received from the second UE 105-2. In the example of FIG. 1B, the NAAF 125 may determine to utilize the second application server 130-2 to provide the second application to the second UE 105-2 based on comparing the core KPIs, the MEC KPIs, and the second application KPIs with the second application parameters and the KPI targets. The NAAF 125 may determine to utilize the second application server 130-2 to provide the second application to the second UE 105-2 when the comparison of the core KPIs, the MEC KPIs, and the second application KPIs with the second application parameters and the KPI targets indicates to utilize the second application server 130-2.

As shown at step 12 of FIG. 1B, the NAAF 125 may instruct the second application server 130-2 that the second application server 130-2, via a core endpoint, is to provide the second application to the second UE 105-2, rather than the MEC device 120. As shown at step 13, the NAAF 125 may instruct core network 115 that the second application server 130-2 is to provide the second application to the second UE 105-2, rather than the MEC device 120. Thus, the NAAF 125 may transmit information identifying the second application server 130-2 as the endpoint of the second application. The NAAF 125, after determining to utilize the second application server 130-2 for providing the second application to the second UE 105-2, may identify a second UPF associated with the second application server 130-2. In some aspects, the NAAF 125 may transmit the information identifying the second application server 130-2 as the endpoint of the second application with additional details, such as an expected service quality, an estimated cost savings, or potential performance improvements. Such details may identify the benefits of selecting the second application server 130-2 as the endpoint of the second application, and may aid in the decision-making process. Additionally, or alternatively, the NAAF 125 may consider user subscription levels when determining the most appropriate UPF for anchoring the second UE 105-2 and the second application. This consideration ensures that the service level provided is consistent with the user's subscription, maintaining customer satisfaction and service quality. As shown at step 14 of FIG. 1B, the NAAF 125 may cause the second UE 105-1 and the second application (e.g., of the second application server 130-2) to be anchored at the second UPF associated with the second application server 130-2.

In some implementations, the anchoring process to a UPF as a core endpoint for the second UE 105-2 and the second application may include evaluating the possibility of future re-anchoring. This evaluation may be based on anticipated changes in network conditions or user behavior, and may ensure that the second application delivery remains optimal over time. Additionally, or alternatively, the NAAF 125 may utilize alternative routing options for the second application's data traffic, such as utilizing a hybrid approach that combines both the MEC device 120 and resources of the core network 115. This may provide improved performance and user experience. Furthermore, the NAAF 125 may provide the first UE 105-1 or the second UE 105-2 with real-time updates or notifications regarding statuses of the application requests, including any changes in the anchoring process or KPI discovery outcomes.

Figure 1C:
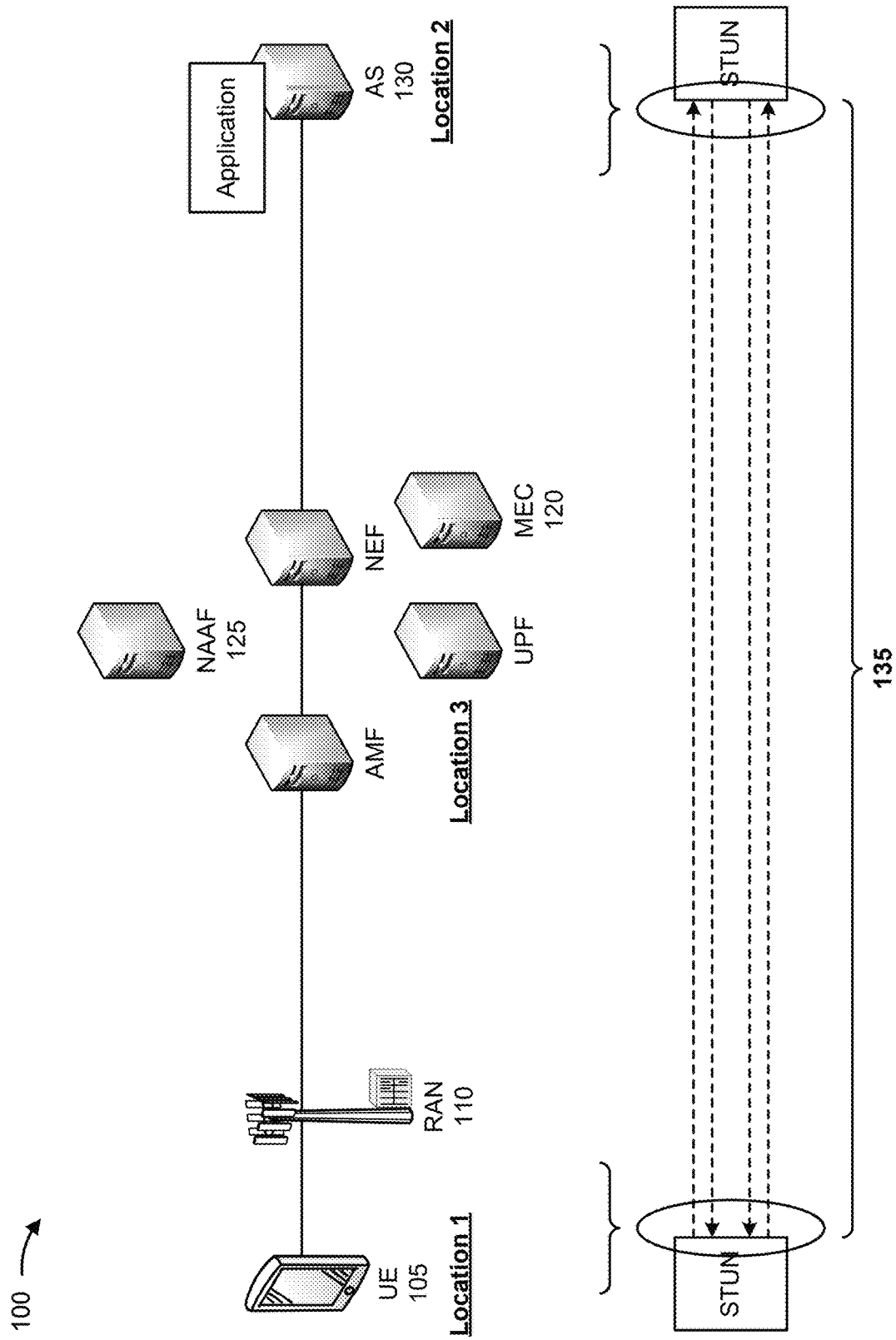

As shown in FIG. 1C, a UE 105 may be located at a first location (e.g., location 1), an application server 130 hosting an application may be located at a second location (e.g., location 2), and a UPF and the MEC device 120 may be located at a third location (e.g., location 3). The UE 105 may initially receive the application from the application server 130. As further shown in FIG. 1C, and by reference number 135, the NAAF 125 may utilize a protocol (e.g., a session traversal utilities for network address translation (STUN) protocol) to facilitate communication and data exchange. For example, the NAAF 125 may utilize the STUN protocol to receive KPIs from various network components, such as the core network 115, MEC devices 120, and application servers 130. Additionally, or alternatively, the NAAF 125 may utilize other protocols besides the STUN protocol for communication and data exchange, such as an interactive connectivity establishment (ICE) protocol or a traversal using relays around network address translation (TURN) protocol. These protocols may offer different mechanisms for establishing network connectivity and exchanging data, and may provide the NAAF 125 with additional options for receiving KPIs and managing network resources. For example, the ICE protocol may be used in scenarios where multiple network paths are available, allowing the NAAF 125 to select a most efficient route for data transmission.

In some implementations, the STUN protocol may indicate (e.g., to the NAAF 125) that the application server 130 has a long queuing time. For instance, the STUN protocol may provide end-to-end metrics that represent the application level experience of the UE 105, such as user queue times at the application server 130, jitter associated with the application server 130, wait times associated with the application server 130, and latency associated with the application server 130. These metrics may be utilized by the NAAF 125 to determine a UPF for providing the application to the UE 105, for example, and to ensure a good end-user gaming experience. Thus, the NAAF 125 may provide improved application performance for the UE 105 and a more efficient use of network resources, which can lead to a reduction in wait times and enhanced overall user experience.

Additionally, or alternatively, the NAAF 125 may utilize direct feedback from the UE 105 or other network probes to assess the queuing time at the application server 130. This direct feedback may come in the form of user reports, network analytics, or real-time monitoring tools that provide a more granular view of the network's performance. By incorporating this feedback, the NAAF 125 may gain a more comprehensive understanding of the queuing times associated with the application server 130 and make more informed decisions regarding UPF selection. Additionally, or alternatively, the NAAF 125 may utilize predictive analytics to anticipate long queuing times at the application server 130, rather than relying on real-time metrics, to proactively manage UPF selection. Predictive analytics may utilize historical data and trend analysis to forecast potential bottlenecks and performance issues before they impact the UE 105. This proactive approach may enable the NAAF 125 to adjust UPF assignments in advance, potentially avoiding service degradation and maintaining a high level of application performance.

Additionally, or alternatively, the NAAF 125 may utilize machine learning models to analyze patterns in KPIs from the core network 115, the MEC device 120, and the application servers 130 to improve an accuracy of determining the optimal UPF. A machine learning model can identify complex correlations and trends that may not be immediately apparent, enabling the NAAF 125 to refine decision-making processes and adapt to changing network conditions more effectively. Additionally, or alternatively, the NAAF 125 may utilize a combination of the STUN protocol and QoS parameters to evaluate the application level experience of the UE 105. QoS parameters, such as bandwidth allocation, latency thresholds, and packet prioritization, can complement the KPIs obtained through the STUN protocol, providing a more nuanced view of the network's ability to support high-quality application delivery.

Additionally, or alternatively, the NAAF 125 may utilize additional metrics, such as packet loss, throughput, and error rates, from the core network 115, the MEC device 120, and the application servers 130 to determine the optimal UPF. These additional metrics can offer insights into an overall health and efficiency of the network, and may enable the NAAF 125 to identify potential issues that could impact application performance and user satisfaction. Additionally, or alternatively, the NAAF 125 may employ a hybrid approach that combines STUN protocol data with historical network performance data to predict and manage network conditions. The hybrid approach can leverage the strengths of both real-time and historical data analysis, providing a more comprehensive strategy for network management and application delivery optimization.

Additionally, or alternatively, the NAAF 125 may utilize virtual network functions (VNFs) to simulate various network scenarios and determine the best UPF based on the simulation outcomes. The VNFs may create virtualized test environments that mimic real-world network conditions, allowing the NAAF 125 to experiment with different configurations and strategies without impacting live network operations. Additionally, or alternatively, the NAAF 125 may utilize external data sources, such as gaming platforms or content delivery networks, to obtain additional insights into performance of the application server 130 and user experience. These external data sources can provide context-specific information that enhances the ability of the NAAF 125 to tailor UPF selection to the unique requirements of different applications and user groups.

Figure 1D:
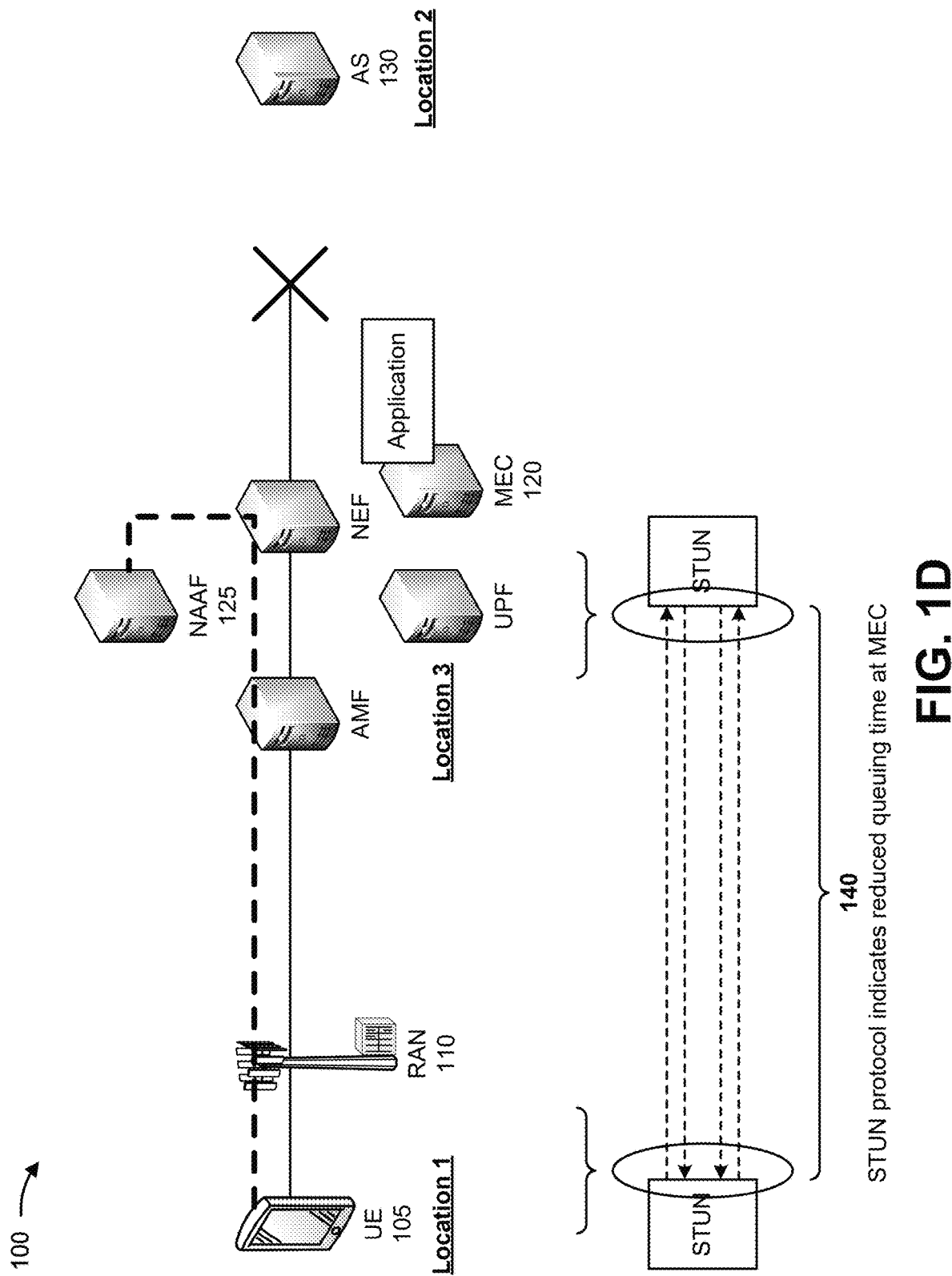

As shown in FIG. 1D, and by reference number 140, the NAAF 125 may utilize a protocol (e.g., the STUN protocol) to determine that the UE 105 will experience reduced queuing times if the application is implemented at the MEC device 120 and the UPF associated with the MEC device 120 (e.g., located at the third location). The dotted line in FIG. 1D indicates a path of non-access stratum (NAS) message extensions for the UE 105. For example, the NAAF 125 may utilize the STUN protocol to receive KPIs from the core network 115, the MEC device 120, and the application server 130. The KPIs may enable the NAAF 125 to determine that the queuing times at the MEC device 120 are better than the queuing times at the application server 130. Based on this information, the NAAF 125 may steer the UE 105 to the MEC device 120 for a better user experience. In some implementations, the NAAF 125 may utilize other protocols, such as a real-time transport protocol (RTP) or a real-time streaming protocol (RTSP) to determine the queuing times at the MEC device 120 and the application server 130.

Additionally, or alternatively, the NAAF 125 may implement a dynamic threshold for queuing times that adjusts based on historical data, time of day, or expected application server load. This dynamic approach may ensure that the steering decisions remain optimal under varying network conditions. Additionally, or alternatively, the NAAF 125 may provide the UE 105 with options to manually select between the MEC device 120 and the application server 130 based on displayed queuing times and other KPIs. Empowering users with that choice can enhance their satisfaction, especially for those who prefer to have control over their gaming experience.

Additionally, or alternatively, the NAAF 125 may consider a geographic location of the UE 105 and a proximity of the UE 105 to the MEC device 120 or the application server 130 when determining the optimal device for application delivery. Proximity can significantly impact latency and performance for the application, and may be utilized as a factor in the steering decision. Additionally, or alternatively, the NAAF 125 may collaborate with other network functions, such as the UPF, to share KPIs and jointly decide on the best device for the UE 105. Collaboration can lead to more holistic network management and improved overall performance. Additionally, or alternatively, the NAAF 125 may periodically re-evaluate the device selection for the UE 105, and may allow for re-steering the UE 105 to the application server 130 if the queuing times at the MEC device 120 increase or if the performance of the application server 130 improves. This flexibility ensures that the UE 105 is always receiving the best possible service.

As shown in FIG. 1E, the UE 105 may be located at the first location (e.g., location 1), the application server 130 hosting the application may be located at the second location (e.g., location 2), and the UPF and the MEC device 120 may be located at the third location (e.g., location 3). The UE 105 may initially receive the application from the application server 130. As further shown in FIG. 1E, and by reference number 145, the NAAF 125 may utilize a protocol (e.g., the STUN protocol) to determine that the application server 130 has a high latency. For example, the NAAF 125 may receive KPIs from the core network 115, the MEC device 120, and the application server 130. The NAAF 125 may compare these KPIs with the KPI targets for the application requested by the UE 105. Based on this comparison, the NAAF 125 may determine whether to utilize the MEC device 120 or the application server 130 for providing the application to the UE 105.

As shown in FIG. 1F, and by reference number 150, the NAAF 125 may utilize a protocol (e.g., the STUN protocol) to determine that the UE 105 will experience reduced latency if the application is implemented at the MEC device 120 and the UPF associated with the MEC device 120 (e.g., located at the third location). The dotted line in FIG. 1F indicates a path of NAS message extensions for the UE 105. For example, the NAAF 125 may utilize the STUN protocol to receive KPIs from the core network 115, the MEC device 120, and the application server 130. The KPIs may enable the NAAF 125 to determine that the latency at the MEC device 120 is less than the latency at the application server 130. Based on this information, the NAAF 125 may steer the UE 105 to the MEC device 120 for a better user experience.

Additionally, or alternatively, the NAAF 125 may use historical data and predictive analytics to anticipate high latency situations and proactively steer the UE 105 to the MEC device 120 before latency issues arise. This proactive approach can prevent degradation of the application experience by avoiding potential latency spikes. For example, if historical data shows that the application server 130 typically experiences high latency during peak hours, the NAAF 125 could preemptively direct the UE 105 to the MEC device 120 during those times. Additionally, or alternatively, the NAAF 125 may implement a threshold-based system where a decision to switch between the MEC device 120 and the application server 130 is made when KPIs cross certain predefined thresholds. The threshold-based system can automate the decision-making process, ensuring that the application delivery is optimized without manual intervention. For example, if the latency at the application server 130 exceeds a certain threshold, the NAAF 125 may automatically initiate a switch to the MEC device 120.

Additionally, or alternatively, the NAAF 125 may consider the geographic location of the UE 105 and the proximity to the MEC device 120 or the application server 130 when determining a best route for application delivery. The proximity may significantly impact the latency and overall user experience, and a closer proximity of the UE 105 to a server device typically results in lower latency. For example, if the UE 105 is physically closer to the MEC device 120 than the application server 130, the NAAF 125 may prioritize routing the application through the MEC device 120 since the reduced distance may provide lower latency. Additionally, or alternatively, the NAAF 125 may utilize a weighted scoring system that combines multiple KPIs to assess the overall network performance and make a more nuanced decision on whether to utilize the MEC device 120 or the application server 130. The scoring system may consider various factors, such as latency, jitter, packet loss, and throughput to calculate an overall performance score, which can then be used to guide the routing decision. For instance, even if the latency is acceptable, a high jitter score might influence the NAAF 125 to choose the MEC device 120 over the application server 130.

Additionally, or alternatively, the NAAF 125 may consider a current network load and congestion levels at the MEC device 120 and the application server 130 when comparing KPIs with the target KPIs. This consideration can help avoid routing the UE 105 to a device that is already experiencing high traffic and potential performance degradation. For example, if the application server 130 is congested, the NAAF 125 may decide to route the application through the MEC device 120, even if the latency KPIs are within acceptable limits, to ensure a smoother application experience for the UE 105. Additionally, or alternatively, the NAAF 125 may use machine learning models to analyze patterns in KPIs and improve the accuracy of predicting high latency situations over time. By learning from past performance data, the NAAF 125 can become more adept at foreseeing and mitigating latency issues, leading to a more reliable application delivery. For instance, a machine learning model can help the NAAF 125 identify trends that precede high latency events, allowing for preemptive action to be taken.

Additionally, or alternatively, the NAAF 125 may provide feedback to the core network 115, the MEC device 120, and the application server 130 to optimize configurations and reduce latency based on the KPI analysis. The feedback can lead to continuous improvement in network performance and application delivery. For example, if the NAAF 125 consistently observes high latency from the application server 130, the NAAF 125 may suggest network configuration changes to the application server 130 to address the issue. Additionally, or alternatively, the NAAF 125 may consider the type of application requested by the UE 105, such as gaming or streaming, and may adjust the KPI targets accordingly to ensure optimal performance for the specific application type. Different applications have varying performance requirements, and the NAAF 125 can tailor the KPI targets to meet these specific needs. For instance, a gaming application may require lower latency compared to a streaming application, and the NAAF 125 can set stricter latency targets for gaming traffic.

Figure 1G:
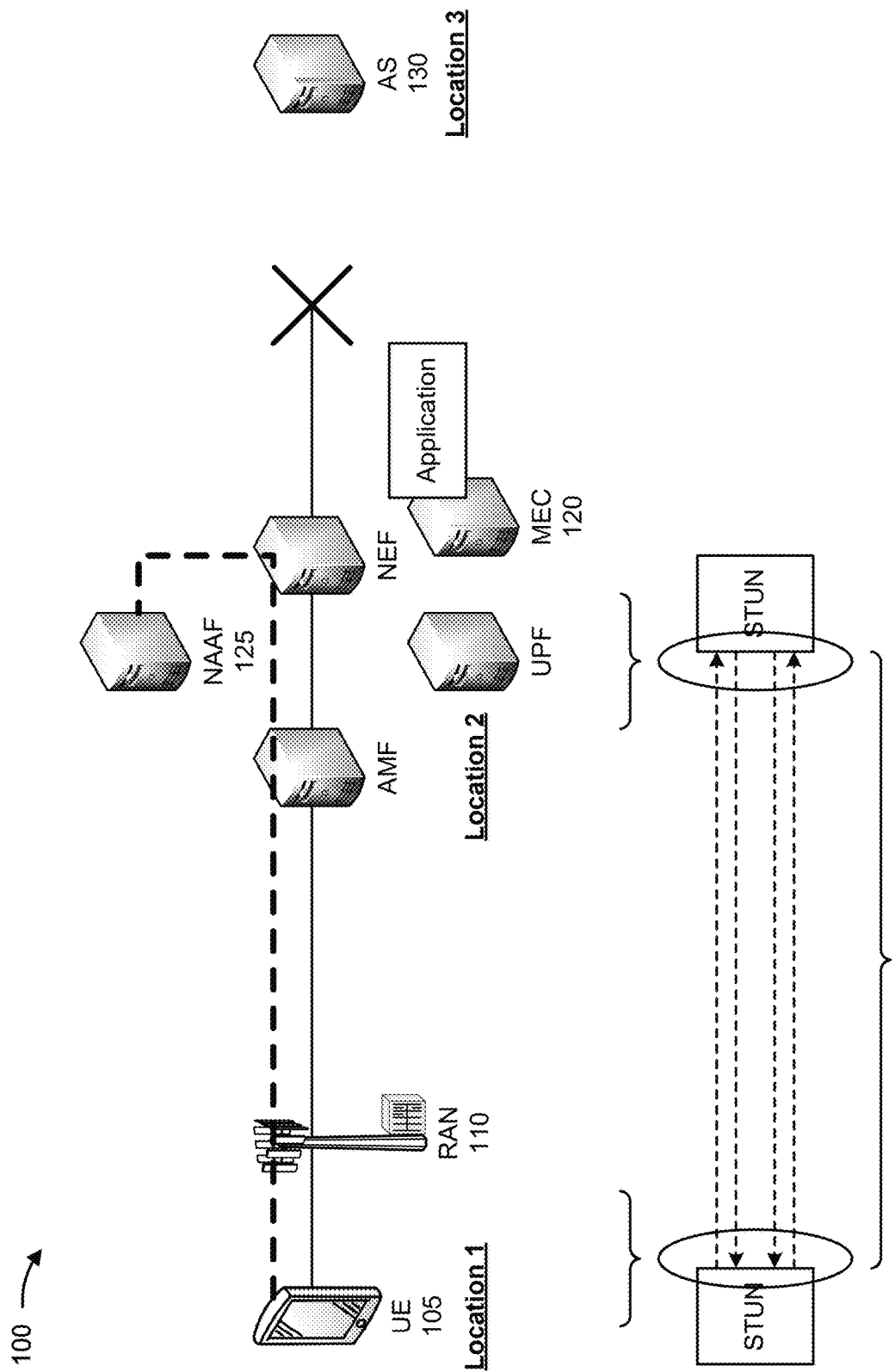

As shown in FIG. 1G, the UE 105 may be located at the first location (e.g., location 1), the UPF and the MEC device 120 may be located at a second location (e.g., location 2), and the application server 130 hosting the application may be located at a third location (e.g., location 3). The dotted line in FIG. 1G indicates a path of NAS message extensions for the UE 105. The UE 105 may initially receive the application from the MEC device 120. As further shown in FIG. 1G, and by reference number 155, the NAAF 125 may utilize a protocol (e.g., the STUN protocol) to determine that the MEC device 120 has bad jitter. For example, the NAAF 125 may receive KPIs from the core network 115, the MEC device 120, and the application server 130. The NAAF 125 may compare these KPIs with the KPI targets for the application requested by the UE 105. Based on this comparison, the NAAF 125 may determine whether to utilize the MEC device 120 or the application server 130 for providing the application to the UE 105.

The NAAF 125 may utilize the STUN protocol to detect and signal that the jitter experienced at the MEC device 120 is beyond one or more acceptable thresholds for a premium gaming experience. The bad jitter at the MEC device 120 impacts an application level experience at the UE 105, particularly for latency-sensitive applications such as online gaming or virtual reality applications. Additionally, or alternatively, the NAAF 125 may receive additional KPIs beyond jitter, such as packet loss or throughput, from the MEC device 120 to assess the application's performance. By considering a broader range of KPIs, the NAAF 125 can gain a more comprehensive understanding of the network conditions and the application experience at the UE 105. For example, high packet loss may indicate network congestion, which, coupled with jitter, could severely degrade the quality of a real-time application.

Additionally, or alternatively, the NAAF 125 may initiate alternative corrective actions, such as adjusting network parameters or reallocating resources, instead of steering or re-anchoring to a different UPF. These corrective actions may include changing the QoS settings for affected traffic flows, or provisioning additional bandwidth to alleviate the jitter. Such measures can be particularly effective in scenarios where re-anchoring may not be feasible or would result in unnecessary service disruption. Additionally, or alternatively, the NAAF 125 may consider a status of other network elements, such as the core network 115 or the application servers 130, when evaluating the need for steering or re-anchoring due to bad jitter at the MEC device 120. By taking a holistic view of the network, the NAAF 125 can identify the root cause of the jitter and address it more effectively, whether it originates from the MEC device 120 or another part of the network infrastructure.

Additionally, or alternatively, the NAAF 125 may communicate with other network functions, such as a network slicing management function, to coordinate a comprehensive response to bad jitter at the MEC device 120. This collaborative approach may ensure that all relevant network functions are aligned in their efforts to maintain the QoS, leading to more effective jitter management and an improved user experience. Additionally, or alternatively, the NAAF 125 may provide feedback to the MEC device 120 regarding performance, which may enable the MEC device 120 to self-optimize and reduce instances of bad jitter. By sharing performance data and insights with the MEC device 120, the NAAF 125 provide a feedback loop that encourages continuous improvement in the operation of the MEC device 120 and the ability of the MEC device 120 to handle real-time applications.

Figure 1H:
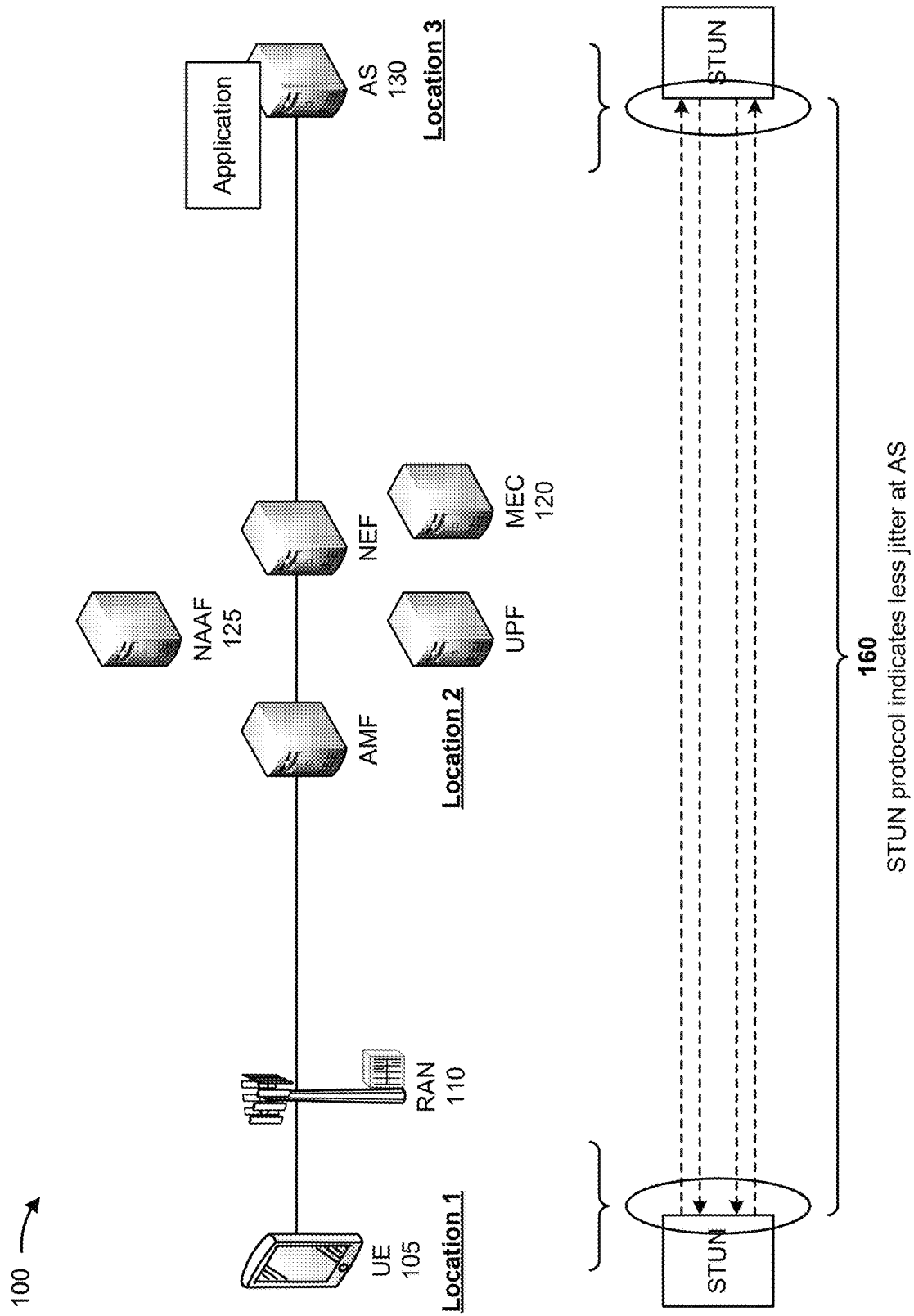

As shown in FIG. 1H, and by reference number 160, the NAAF 125 may utilize a protocol (e.g., the STUN protocol) to determine that the UE 105 will experience less jitter if the application is implemented at the application server 130 instead of the MEC device 120. For example, the NAAF 125 may utilize the STUN protocol to receive KPIs from the core network 115, the MEC device 120, and the application server 130. The KPIs may enable the NAAF 125 to determine that the jitter at the MEC device 120 is greater than the jitter at the application server 130. For example, the NAAF 125, upon analyzing the KPIs, may determine that the application server 130 has improved jitter metrics, which are within the target limits for providing a satisfactory user experience for applications such as online gaming, virtual reality, augmented reality, or mixed reality applications. Based on this information, the NAAF 125 may steer the UE 105 to the application server 130 for a better user experience.

Additionally, or alternatively, the NAAF 125 may determine to utilize the application server 130 based on other performance metrics besides jitter, such as latency, packet loss, or throughput. These metrics may ensure a high-quality user experience, especially for time-sensitive applications, and may influence the decision to route traffic through the application server 130 rather than the MEC device 120. Additionally, or alternatively, the NAAF 125 may consider user subscription information, such as whether the UE 105 is subscribed to a premium gaming service, when determining whether to utilize the application server 130 for providing the application. This consideration allows for a more personalized service delivery, potentially prioritizing subscribers of premium services for optimal network paths.

Figure 1I:
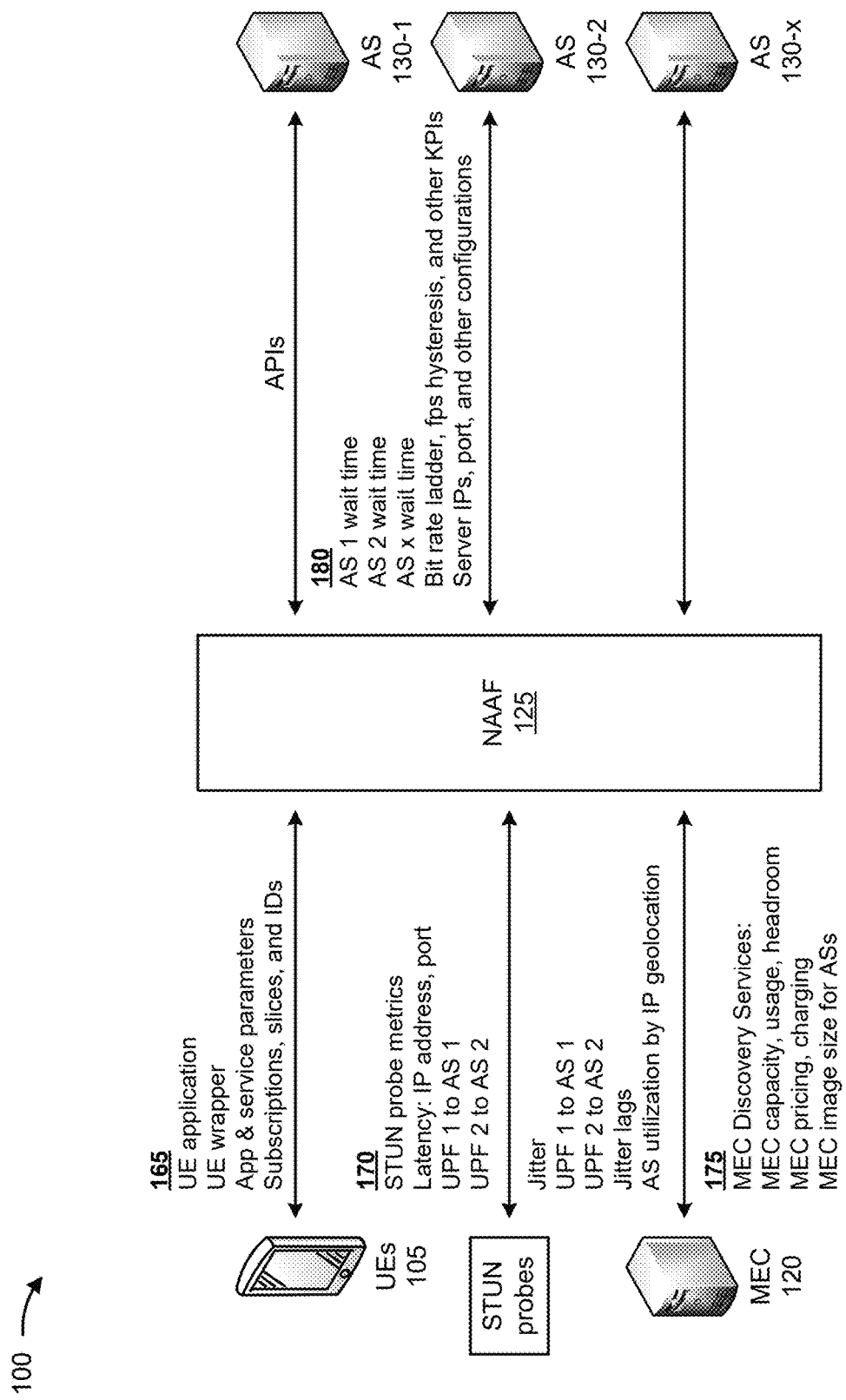

FIG. 1I depicts an example of utilizing the NAAF 125 for cloud computing environment-based gaming. As shown, the NAAF 125 may be associated with UEs 105, STUN probes, the MEC device 120, a first application server 130-1, a second application server 130-2, and a third application server 130-3. As shown in FIG. 1I, and by reference number 165, the NAAF 125 may receive information from the UEs 105, such as information associated with a UE application, UE wrappers, application and service parameters, subscriptions, slices, identifiers (IDs), and/or the like.

As further shown in FIG. 1I, and by reference number 170, the NAAF 125 may receive information from the STUN probes, such as information associated with STUN probe metrics, latency, UPF and application server communications, jitter, jitter lags, application server utilization by geolocation, and/or the like. As further shown in FIG. 1I, and by reference number 175, the NAAF 125 may receive information from the MEC device 120, such as information associated with MEC discovery services, MEC capacity, MEC usage, MEC headroom, MEC pricing, MEC charging, MEC image size for application servers, and/or the like. As further shown in FIG. 1I, and by reference number 180, the NAAF 125 may receive information from the application servers 130, such as information associated with a wait time at the first application server 130-1, a wait time at the second application server, a wait time at the third application server, a bit rate ladder, hysteresis, other KPIs, application server network addresses, application server ports, application server configurations, and/or the like.

In this way, the NAAF 125 provides application and subscription aware UPF selection, steering, and anchoring. For example, the NAAF 125 may optimize network traffic management for online gaming applications by reducing a time required to establish connections with gaming application servers during periods of high network demand. For example, the NAAF 125 may obtain end-to-end metrics representing a UE application level experience based on UE subscription information and a protocol analysis, and may provide UPF selection, steering, and anchoring for a UE 105 based on the end-to-end metrics. The selected UPF may optimize network efficiency for gaming application traffic provided to the UE 105. The NAAF 125 may adjust the UPF selection in response to gaming application server congestion, and may steer gaming traffic to a MEC device 120. The NAAF 125 may re-anchor the UPF from a MEC device 120 to an SAP UPF based on improved end-to-end metrics, and may activate MEC UPF steering for a UE 105 subscribed to a premium gaming service. Thus, the NAAF 125 may conserve computing resources, networking resources, and/or other resources that would have otherwise been consumed by handling delays associated with traffic congestion at gaming application servers, failing to provide mechanisms that derive end-to-end metrics that represent a user-level experience for gaming applications, handling failures associated with providing a promised QoS for gaming applications, failing to provide adequate service for gaming applications during peak usage times, and/or the like.

As indicated above, FIGS. 1A-1I are provided as an example. Other examples may differ from what is described with regard to FIGS. 1A-1I. The number and arrangement of devices shown in FIGS. 1A-1I are provided as an example. In practice, there may be additional devices, fewer devices, different devices, or differently arranged devices than those shown in FIGS. 1A-1I. Furthermore, two or more devices shown in FIGS. 1A-1I may be implemented within a single device, or a single device shown in FIGS. 1A-1I may be implemented as multiple, distributed devices. Additionally, or alternatively, a set of devices (e.g., one or more devices)

shown in FIGS. 1A-1I may perform one or more functions described as being performed by another set of devices shown in FIGS. 1A-1I.

Figure 2:
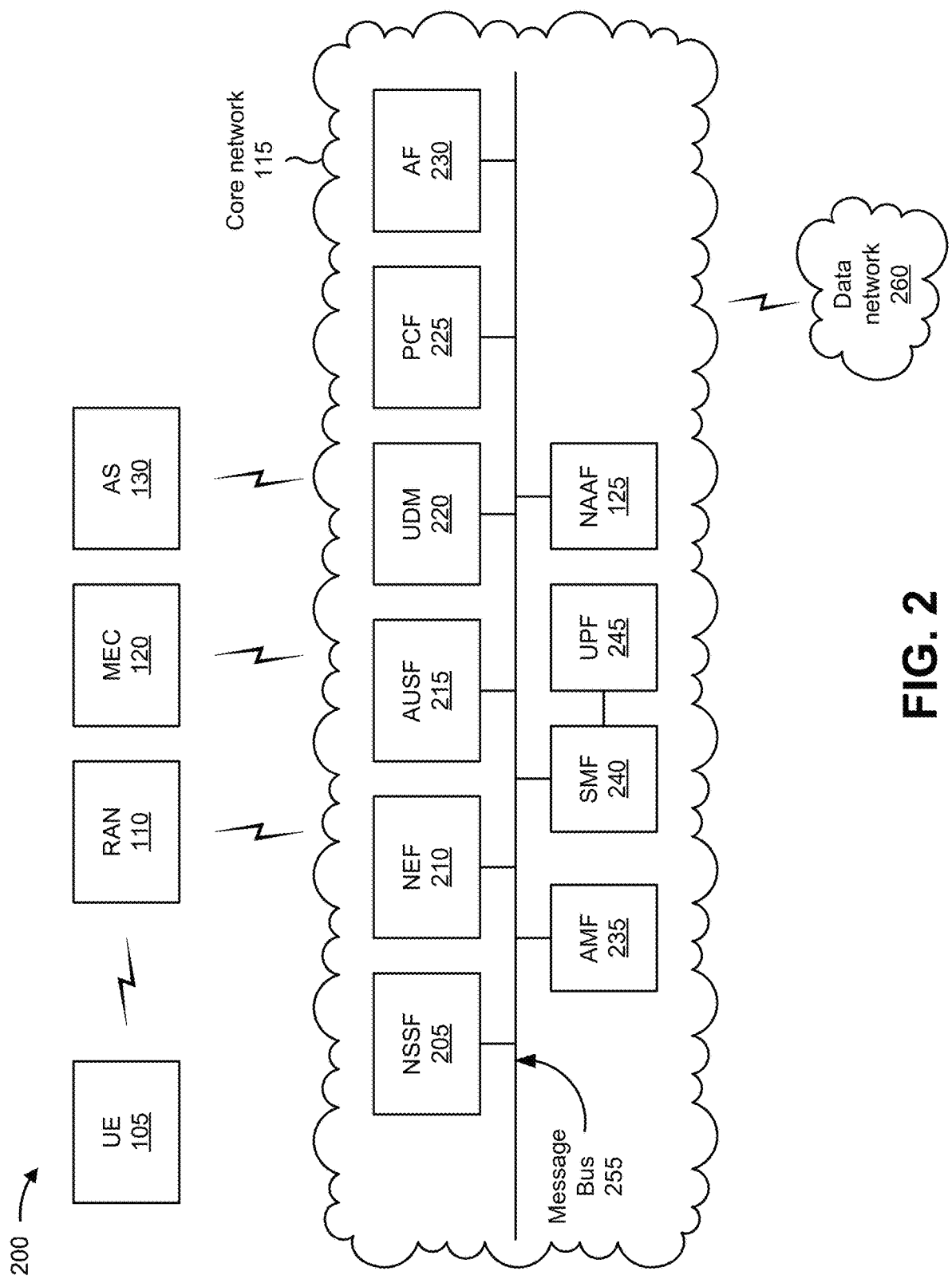
FIG. 2 is a diagram of an example environment in which systems and/or methods described herein may be implemented.

FIG. 2 is a diagram of an example environment 200 in which systems and/or methods described herein may be implemented. As shown in FIG. 2, the example environment 200 may include the UE 105, the RAN 110, the core network 115, the MEC device 120, the application server 130, and a data network 260. Devices and/or networks of the example environment 200 may interconnect via wired connections, wireless connections, or a combination of wired and wireless connections.

The UE 105 includes one or more devices capable of receiving, generating, storing, processing, and/or providing information, such as information described herein. For example, the UE 105 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

The RAN 110 may support, for example, a cellular radio access technology (RAT). The RAN 110 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for the UE 105. The RAN 110 may transfer traffic between the UE 105 (e.g., using a cellular RAT), one or more base stations (e.g., using a wireless interface or a backhaul interface, such as a wired backhaul interface), and/or the core network 115. The RAN 110 may provide one or more cells that cover geographic areas.

In some implementations, the RAN 110 may perform scheduling and/or resource management for the UE 105 covered by the RAN 110 (e.g., the UE 105 covered by a cell provided by the RAN 110). In some implementations, the RAN 110 may be controlled or coordinated by a network controller, which may perform load balancing, network-level configuration, and/or other operations. The network controller may communicate with the RAN 110 via a wireless or wireline backhaul. In some implementations, the RAN 110 may include a network controller, a self-organizing network (SON) module or component, or a similar module or component. In other words, the RAN 110 may perform network control, scheduling, and/or network management functions (e.g., for uplink, downlink, and/or sidelink communications of the UE 105 covered by the RAN 110).

The MEC device 120 may include one or more devices capable of receiving, generating, storing, processing, providing, and/or routing information, as described elsewhere herein. The MEC device 120 may include a communication device and/or a computing device. For example, the MEC device 120 may include a server, such as an application server, a client server, a web server, a database server, a host server, a proxy server, a virtual server (e.g., executing on computing hardware), or a server in a cloud computing system. In some implementations, the MEC device 120 may include computing hardware used in a cloud computing environment.

The application server 130 may include one or more devices capable of receiving, generating, storing, processing, providing, and/or routing information, as described elsewhere herein. The application server 130 may include a communication device and/or a computing device. For example, the application server 130 may include a server, such as an application server, a client server, a web server, a database server, a host server, a proxy server, a virtual server (e.g., executing on computing hardware), or a server in a cloud computing system. In some implementations, the application server 130 may include computing hardware used in a cloud computing environment.

In some implementations, the core network 115 may include an example functional architecture in which systems and/or methods described herein may be implemented. For example, the core network 115 may include an example architecture of a 5G Next Generation (NG) core network included in a 5G wireless telecommunications system. While the example architecture of the core network 115 shown in FIG. 2 may be an example of a service-based architecture, in some implementations, the core network 115 may be implemented as a reference-point architecture and/or a 4G core network, among other examples.

As shown in FIG. 2, the core network 115 may include a number of functional elements. The functional elements may include, for example, the NAAF 125, a network slice selection function (NSSF) 205, a network exposure function (NEF) 210, an authentication server function (AUSF) 215, a unified data management (UDM) device 220, a policy control function (PCF) 225, an application function (AF) 230, an access and mobility management function (AMF) 235, a session management function (SMF) 240, and/or a user plane function (UPF) 245. These functional elements may be communicatively connected via a message bus 255. Each of the functional elements shown in FIG. 2 is implemented on one or more devices associated with a wireless telecommunications system. In some implementations, one or more of the functional elements may be implemented on physical devices, such as an access point, a base station, and/or a gateway. In some implementations, one or more of the functional elements may be implemented on a computing device of a cloud computing environment.

The NAAF 125 includes one or more devices that determine steering mechanisms for UEs 105 and applications. The NAAF 125 may utilize UE subscription information and a protocol (e.g., STUN protocol) analysis to derive end-to-end metrics (e.g., for a UE 105 to an application server 130) for UPF selection, steering, and anchoring.

The NSSF 205 includes one or more devices that select network slice instances for the UE 105. By providing network slicing, the NSSF 205 allows an operator to deploy multiple substantially independent end-to-end networks potentially with the same infrastructure. In some implementations, each slice may be customized for different services.

The NEF 210 includes one or more devices that support exposure of capabilities and/or events in the wireless telecommunications system to help other entities in the wireless telecommunications system discover network services.

The AUSF 215 includes one or more devices that act as an authentication server and support the process of authenticating the UE 105 in the wireless telecommunications system.

The UDM 220 includes one or more devices that store user data and profiles in the wireless telecommunications system. The UDM 220 may be used for fixed access and/or mobile access in the core network 115.

The PCF 225 includes one or more devices that provide a policy framework that incorporates network slicing, roaming, packet processing, and/or mobility management, among other examples.

The AF 230 includes one or more devices that support application influence on traffic routing, access to the NEF 210, and/or policy control, among other examples.

The AMF 235 includes one or more devices that act as a termination point for non-access stratum (NAS) signaling and/or mobility management, among other examples.

The SMF 240 includes one or more devices that support the establishment, modification, and release of communication sessions in the wireless telecommunications system. For example, the SMF 240 may configure traffic steering policies at the UPF 245 and/or may enforce user equipment Internet protocol (IP) address allocation and policies, among other examples.

The UPF 245 includes one or more devices that serve as an anchor point for intraRAT and/or interRAT mobility. The UPF 245 may apply rules to packets, such as rules pertaining to packet routing, traffic reporting, and/or handling user plane QoS, among other examples.

The message bus 255 represents a communication structure for communication among the functional elements. In other words, the message bus 255 may permit communication between two or more functional elements.

The data network 260 includes one or more wired and/or wireless data networks. For example, the data network 260 may include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third-party services network, an operator services network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the example environment 200 may perform one or more functions described as being performed by another set of devices of the example environment 200.

Figure 3:
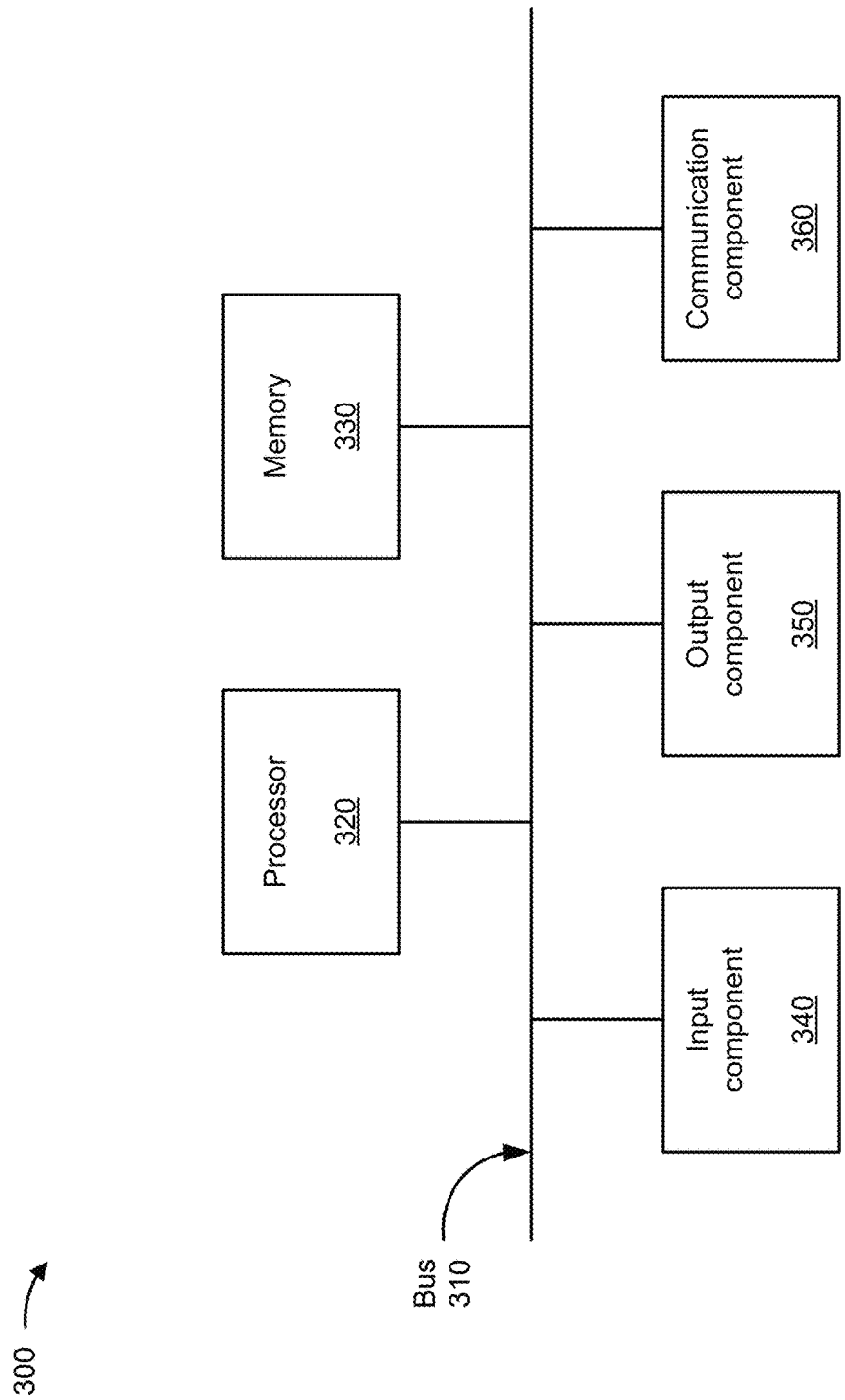
FIG. 3 is a diagram of example components of one or more devices of FIG. 2.

FIG. 3 is a diagram of example components of a device 300, which may correspond to the UE 105, the RAN 110, the MEC device 120, the NAAF 125, the application server 130, the NSSF 205, the NEF 210, the AUSF 215, the UDM 220, the PCF 225, the AF 230, the AMF 235, the SMF 240, and/or the UPF 245. In some implementations, the UE 105, the RAN 110, the MEC device 120, the NAAF 125, the application server 130, the NSSF 205, the NEF 210, the AUSF 215, the UDM 220, the PCF 225, the AF 230, the AMF 235, the SMF 240, and/or the UPF 245 may include one or more devices 300 and/or one or more components of the device 300. As shown in FIG. 3, the device 300 may include a bus 310, a processor 320, a memory 330, an input component 340, an output component 350, and a communication component 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. Memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication component 360 enables the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
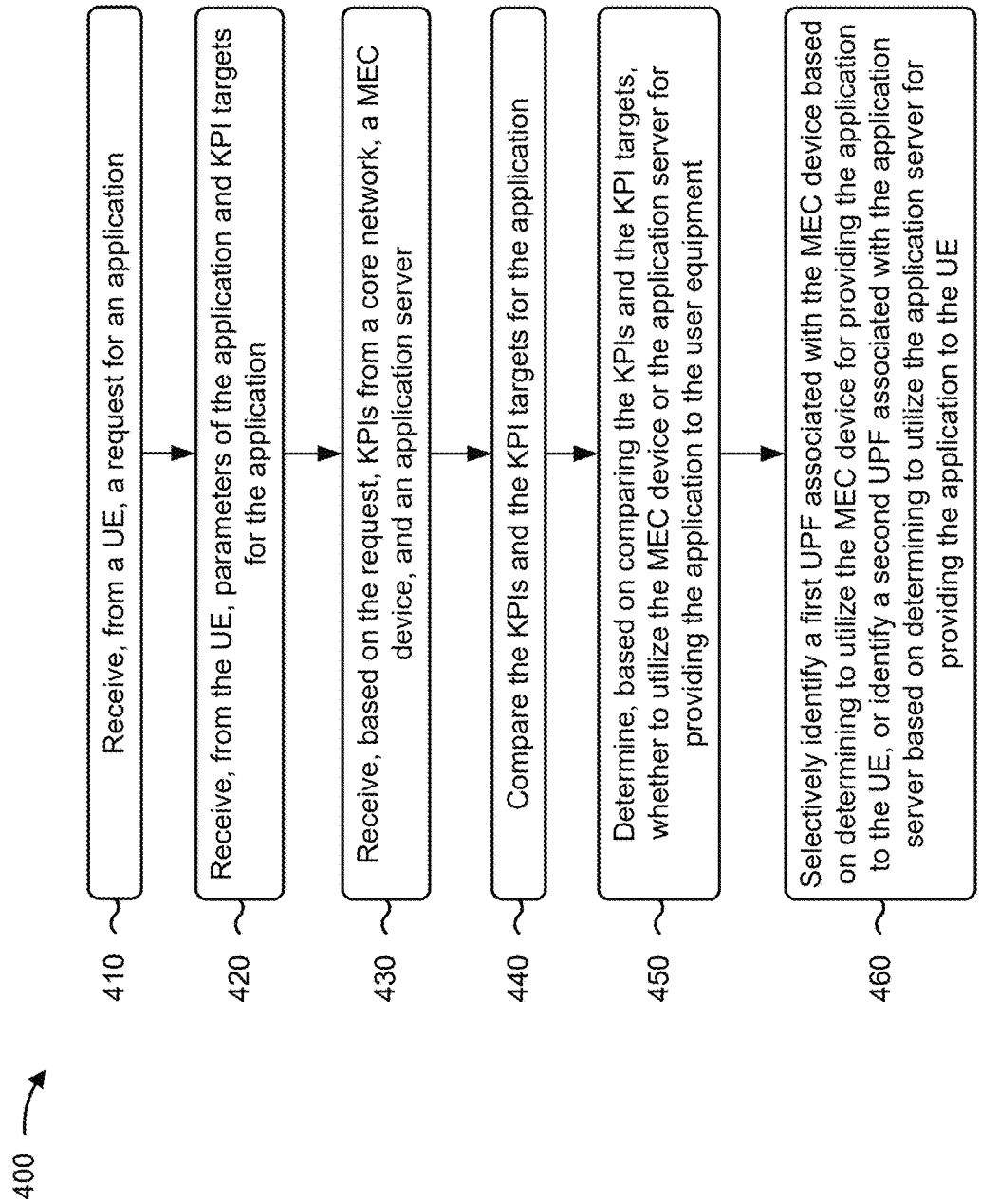
FIG. 4 is a flowchart of an example process for providing application and subscription aware UPF selection, steering, and anchoring.

FIG. 4 is a flowchart of an example process 400 for providing application and subscription aware UPF selection, steering, and anchoring. In some implementations, one or more process blocks of FIG. 4 may be performed by a device (e.g., the NAAF 125). In some implementations, one or more process blocks of FIG. 4 may be performed by another device or a group of devices separate from or including the device, such as a UE (e.g., the UE 105), an MEC device (e.g., the MEC device 120), and/or the like. Additionally, or alternatively, one or more process blocks of FIG. 4 may be performed by one or more components of the device 300, such as the processor 320, the memory 330, the input component 340, the output component 350, and/or the communication component 360.

As shown in FIG. 4, process 400 may include receiving, from a UE, a request for an application (block 410). For example, the device may receive, from a UE, a request for an application, as described above. In some implementations, the application is one of an online gaming application, a virtual reality application, an augmented reality application, or a mixed reality application.

As further shown in FIG. 4, process 400 may include receiving, from the UE, parameters of the application and KPI targets for the application (block 420). For example, the device may receive, from the UE, parameters of the application and KPI targets for the application, as described above.

As further shown in FIG. 4, process 400 may include receiving, based on the request, KPIs from a core network, an MEC device, and an application server (block 430). For example, the device may receive, based on the request, KPIs from a core network, an MEC device, and an application server, as described above. In some implementations, receiving the KPIs from the core network, the MEC device, and the application server includes utilizing a STUN protocol to receive the KPIs from the core network, the MEC device, and the application server. In some implementations, the KPIs include end-to-end metrics representing an application-level experience of the UE.

In some implementations, receiving the KPIs from the core network, the MEC device, and the application server includes receiving the KPIs from one or more protocol probes associated with the core network, the MEC device, and the application server. In some implementations, the KPIs include one or more of user queue times at the application server, jitter associated with the application server, server wait times associated with the application server, latency associated with the application server, jitter associated with the MEC device, or latency associated with the MEC device.

As further shown in FIG. 4, process 400 may include comparing the KPIs and the KPI targets for the application (block 440). For example, the device may compare the KPIs and the KPI targets for the application, as described above.

As further shown in FIG. 4, process 400 may include determining, based on comparing the KPIs and the KPI targets, whether to utilize the MEC device or the application server for providing the application to the UE (block 450). For example, the device may determine, based on comparing the KPIs and the KPI targets, whether to utilize the MEC device or the application server for providing the application to the UE, as described above.

As further shown in FIG. 4, process 400 may include selectively identifying a first UPF associated with the MEC device based on determining to utilize the MEC device for providing the application to the UE, or identifying a second UPF associated with the application server based on determining to utilize the application server for providing the application to the UE (block 460). For example, the device may selectively identify a first UPF associated with the MEC device based on determining to utilize the MEC device for providing the application to the UE, or identify a second UPF associated with the application server based on determining to utilize the application server for providing the application to the UE, as described above. In some implementations, determining to utilize the MEC device for providing the application to the UE includes determining to utilize the MEC device for providing the application to the UE based on wait times associated with the application server.

In some implementations, process 400 includes anchoring the UE and application to the first UPF associated with the MEC device based on determining to utilize the MEC device for providing the application to the UE. In some implementations, process 400 includes causing the first UPF and the MEC device to provide the application to the UE based on anchoring the UE and application to the first UPF associated with the MEC device. In some implementations, process 400 includes anchoring the UE and the application to the second UPF associated with the application server based on determining to utilize the application server for providing the application to the UE.

In some implementations, process 400 includes causing the second UPF and the application server to provide the application to the UE based on anchoring the UE and application to the second UPF associated with the application server. In some implementations, process 400 includes receiving an indication of congestion at the application server, and identifying the first UPF associated with the MEC device based on the indication and after identifying the second UPF associated with the application server.

In some implementations, process 400 includes receiving improved end-to-end metrics associated with the application server, and identifying the second UPF associated with the application server based on the improved end-to-end metrics and after identifying the first UPF associated with the MEC device. In some implementations, process 400 includes activating steering by the first UPF and the MEC device for the UE based on determining to utilize the MEC device for providing the application to the UE.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a–b, a–c, b–c, and a–b–c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    receiving, by a device, a request for an application;
    receiving, by the device, parameters of the application and key performance indicator (KPI) targets for the application;
    receiving, by the device and based on the request, KPIs from a core network, a mobile edge computing (MEC) device, and an application server;
    comparing, by the device, the KPIs and the KPI targets for the application;
    determining, by the device and based on comparing the KPIs and the KPI targets, whether to utilize the MEC device or the application server for providing the application to a user equipment; and
    selectively:
        identifying a first user plane function (UPF) associated with the MEC device based on determining to utilize the MEC device for providing the application to the user equipment, or
        identifying a second UPF associated with the application server based on determining to utilize the application server for providing the application to the user equipment.

2. The method of claim 1, further comprising:
    anchoring the user equipment and application to the first UPF associated with the MEC device based on determining to utilize the MEC device for providing the application to the user equipment.

3. The method of claim 2, further comprising:
    causing the first UPF and the MEC device to provide the application to the user equipment based on anchoring the user equipment and application to the first UPF associated with the MEC device.

4. The method of claim 1, further comprising:
    anchoring the user equipment and the application to the second UPF associated with the application server based on determining to utilize the application server for providing the application to the user equipment.

5. The method of claim 4, further comprising:
    causing the second UPF and the application server to provide the application to the user equipment based on anchoring the user equipment and application to the second UPF associated with the application server.

6. The method of claim 1, wherein the device is a network application aware function of the core network.

7. The method of claim 1, wherein receiving the KPIs from the core network, the MEC device, and the application server comprises:
    utilizing a session traversal utilities for network address translation (STUN) protocol to receive the KPIs from the core network, the MEC device, and the application server.

8. A device, comprising:
    one or more processors configured to:
        receive, from a user equipment, a request for an application;
        receive parameters of the application and key performance indicator (KPI) targets for the application;
        utilize, based on the request, a session traversal utilities for network address translation (STUN) protocol to receive KPIs from a core network, a mobile edge computing (MEC) device, and an application server;
        compare the KPIs and the KPI targets for the application;
        determine, based on comparing the KPIs and the KPI targets, whether to utilize the MEC device or the application server for providing the application to the user equipment; and
        selectively:
            identify a first user plane function (UPF) associated with the MEC device based on determining to utilize the MEC device for providing the application to the user equipment, or identify a second UPF associated with the application server based on determining to utilize the application server for providing the application to the user equipment.

9. The device of claim 8, wherein the KPIs include end-to-end metrics representing an application-level experience of the user equipment.

10. The device of claim 8, wherein the one or more processors are further configured to:

receive an indication of congestion at the application server; and identify the first UPF associated with the MEC device based on the indication and after identifying the second UPF associated with the application server.

11. The device of claim 8, wherein the one or more processors, to determine to utilize the MEC device for providing the application to the user equipment, are configured to:

determine to utilize the MEC device for providing the application to the user equipment based on wait times associated with the application server.

12. The device of claim 8, wherein the one or more processors are further configured to:

receive improved end-to-end metrics associated with the application server; and identify the second UPF associated with the application server based on the improved end-to-end metrics and after identifying the first UPF associated with the MEC device.

13. The device of claim 8, wherein the one or more processors are further configured to:

activate steering by the first UPF and the MEC device for the user equipment based on determining to utilize the MEC device for providing the application to the user equipment.

14. The device of claim 8, wherein the application is one of an online gaming application, a virtual reality application, an augmented reality application, or a mixed reality application.

15. A non-transitory computer-readable medium storing a set of instructions, the set of instructions comprising:

one or more instructions that, when executed by one or more processors of a device, cause the device to:

receive, from a user equipment, a request for an application, wherein the application is one of an online gaming application, a virtual reality application, an augmented reality application, or a mixed reality application;

receive parameters of the application and key performance indicator (KPI) targets for the application;

receive, based on the request, KPIs from a core network, a mobile edge computing (MEC) device, and an application server;

compare the KPIs and the KPI targets for the application;

determine, based on comparing the KPIs and the KPI targets, whether to utilize the MEC device or the application server for providing the application to the user equipment; and selectively:

identify a first user plane function (UPF) associated with the MEC device based on determining to utilize the MEC device for providing the application to the user equipment, or identify a second UPF associated with the application server based on determining to utilize the application server for providing the application to the user equipment.

16. The non-transitory computer-readable medium of claim 15, wherein the one or more instructions, that cause the device to receive the KPIs from the core network, the MEC device, and the application server, cause the device to:

receive the KPIs from one or more protocol probes associated with the core network, the MEC device, and the application server.

17. The non-transitory computer-readable medium of claim 15, wherein the KPIs include one or more of user queue times at the application server, jitter associated with the application server, server wait times associated with the application server, latency associated with the application server, jitter associated with the MEC device, or latency associated with the MEC device.

18. The non-transitory computer-readable medium of claim 15, wherein the one or more instructions further cause the device to:

anchor the user equipment and application to the first UPF associated with the MEC device based on determining to utilize the MEC device for providing the application to the user equipment; and cause the first UPF and the MEC device to provide the application to the user equipment based on anchoring the user equipment and application to the first UPF associated with the MEC device.

19. The non-transitory computer-readable medium of claim 15, wherein the one or more instructions further cause the device to:

anchor the user equipment and the application to the second UPF associated with the application server based on determining to utilize the application server for providing the application to the user equipment; and cause the second UPF and the application server to provide the application to the user equipment based on anchoring the user equipment and application to the second UPF associated with the application server.

20. The non-transitory computer-readable medium of claim 15, wherein the one or more instructions further cause the device to:

receive an indication of congestion at the application server; and identify the first UPF associated with the MEC device based on the indication and after identifying the second UPF associated with the application server.

* * * * *